(12) United States Patent
Marta et al.

(10) Patent No.: US 10,883,875 B2
(45) Date of Patent: Jan. 5, 2021

(54) USE OF SELECTED GLASS TYPES AND GLASS THICKNESSES IN THE OPTICAL PATH TO REMOVE CROSS SENSITIVITY TO WATER ABSORPTION PEAKS

(71) Applicant: Honeywell International Inc., Morris Plains, NJ (US)

(72) Inventors: Terry Marta, White Bear Lake, MN (US); Rodney Royston Watts, Wimborne (GB); Antony Leighton Phillips, Poole (GB); Bernard Fritz, Eagan, MN (US); James Allen Cox, Monument, CO (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 51 days.

(21) Appl. No.: 15/555,762

(22) PCT Filed: Mar. 3, 2016

(86) PCT No.: PCT/US2016/020637
§ 371 (c)(1),
(2) Date: Sep. 5, 2017

(87) PCT Pub. No.: WO2016/141155
PCT Pub. Date: Sep. 9, 2016

(65) Prior Publication Data
US 2018/0045563 A1 Feb. 15, 2018

Related U.S. Application Data

(60) Provisional application No. 62/128,745, filed on Mar. 5, 2015.

(51) Int. Cl.
*G01J 3/02* (2006.01)
*G01N 21/3504* (2014.01)
(Continued)

(52) U.S. Cl.
CPC ............... *G01J 3/0229* (2013.01); *G01J 3/42* (2013.01); *G01N 21/3504* (2013.01); *G02B 5/208* (2013.01)

(58) Field of Classification Search
None
See application file for complete search history.

(56) References Cited

U.S. PATENT DOCUMENTS 2,424,976 A    8/1947  Golay et al.
2,924,713 A    2/1960  Liston
(Continued)

FOREIGN PATENT DOCUMENTS

AU     582290 B     3/1989
CN    1685216 A    10/2005
(Continued)

OTHER PUBLICATIONS

Feiertag G et al.: "Flip Chip MEMS microphone package with large acoustic reference volume", Procedia Engineering, Elsevier, Amsterdam, NL, vol. 5, Jan. 1, 2010, pp. 355-358.
(Continued)

*Primary Examiner* — Edwin C Gunberg
(74) *Attorney, Agent, or Firm* — Alston & Bird LLP

(57) ABSTRACT

Embodiments relate generally to systems and methods for filtering unwanted wavelengths from an IR detector. In some embodiments, it may be desired to remove or reduce the wavelengths absorbed by water, to reduce the effects of water on the detection of the target gas. In some embodiments, a filter glass may be used in the IR detector, wherein the filter glass comprises one or more materials that contain hydroxyls in their molecular structure, and wherein the spectral absorption properties of the filter glass are operable to at least reduce wavelengths of light absorbed by water from the optical, thereby reducing the IR detector's cross sensitivity to water.

20 Claims, 4 Drawing Sheets

(51) Int. Cl.
*G01J 3/42* (2006.01)
*G02B 5/20* (2006.01)

(56) References Cited

U.S. PATENT DOCUMENTS

| | | | |
|---|---|---|---|
| 4,370,553 A | 1/1983 | Waycaster et al. | |
| 4,436,428 A | 3/1984 | Watanabe et al. | |
| 4,492,862 A | 1/1985 | Grynberg et al. | |
| 4,535,241 A | 8/1985 | Eberhardt | |
| 4,557,603 A | 12/1985 | Oehler et al. | |
| 4,692,622 A | 9/1987 | Taniguchi et al. | |
| 4,736,103 A | 4/1988 | Nelson et al. | |
| 4,738,266 A | 4/1988 | Thatcher | |
| 4,740,086 A | 4/1988 | Oehler et al. | |
| 4,891,629 A | 1/1990 | Gajjar et al. | |
| 4,903,248 A | 2/1990 | Fertig | |
| 5,055,690 A | 10/1991 | Bonne | |
| 5,394,934 A | 5/1995 | Rein et al. | |
| 5,468,961 A | 11/1995 | Gradon et al. | |
| 5,498,873 A | 3/1996 | Liebermann et al. | |
| 5,559,333 A | 9/1996 | Araya et al. | |
| 5,616,826 A | 4/1997 | Pellaux | |
| 5,760,407 A * | 6/1998 | Margosiak | A61B 5/0071 250/461.1 |
| 5,772,606 A * | 6/1998 | Ashibe | G01N 21/359 600/573 |
| 5,886,249 A | 3/1999 | Bonne et al. | |
| 5,892,140 A | 4/1999 | Wood | |
| 6,067,840 A | 5/2000 | Chelvayohan et al. | |
| 6,222,190 B1 | 4/2001 | Bernstein et al. | |
| 6,327,896 B1 | 12/2001 | Veronesi et al. | |
| 6,469,303 B1 | 10/2002 | Sun et al. | |
| 6,552,792 B1 | 4/2003 | Pilgrim et al. | |
| 6,628,396 B1 | 9/2003 | Gul | |
| 6,853,449 B2 | 2/2005 | Hocker | |
| 6,878,940 B2 | 4/2005 | Nakamura et al. | |
| 7,034,943 B1 | 4/2006 | Moeckli et al. | |
| 7,045,784 B1 | 5/2006 | Ptasinski et al. | |
| 7,214,939 B1 | 5/2007 | Wong | |
| 7,288,766 B2 | 10/2007 | Uchida et al. | |
| 7,477,993 B2 | 1/2009 | Sunshine et al. | |
| 7,663,756 B2 | 2/2010 | Cole | |
| 7,738,116 B2 | 6/2010 | Kauppinen | |
| 7,797,983 B2 | 9/2010 | Kauppinen | |
| 7,808,640 B2 | 10/2010 | Fritz et al. | |
| 7,835,004 B2 | 11/2010 | Uber et al. | |
| 7,895,880 B2 | 3/2011 | Fritz et al. | |
| 7,958,771 B2 | 6/2011 | Rezachek | |
| 7,961,313 B2 | 6/2011 | Van Neste et al. | |
| 8,085,403 B2 | 12/2011 | Fritz et al. | |
| 8,217,355 B1 | 7/2012 | Wong | |
| 8,312,758 B2 | 11/2012 | Tobias | |
| 8,322,191 B2 | 12/2012 | Fritz | |
| 8,373,568 B2 | 2/2013 | Moe et al. | |
| 8,415,626 B1 | 4/2013 | Wong | |
| 8,451,447 B2 | 5/2013 | Fritz et al. | |
| 8,497,996 B2 | 7/2013 | Kauppinen | |
| 8,584,508 B2 | 11/2013 | Rezachek | |
| 8,594,507 B2 | 11/2013 | Youngner et al. | |
| 8,661,874 B2 | 3/2014 | Rezachek | |
| 8,689,607 B2 | 4/2014 | Rezachek et al. | |
| 8,695,402 B2 | 4/2014 | Thorson | |
| 8,701,465 B2 | 4/2014 | Shubinsky et al. | |
| 8,746,038 B2 | 6/2014 | Rezachek | |
| 8,806,916 B2 | 8/2014 | Gautieri | |
| 8,848,191 B2 | 9/2014 | Lust | |
| 8,939,006 B2 | 1/2015 | Rezachek et al. | |
| 9,086,364 B2 | 7/2015 | Rezachek et al. | |
| 9,243,998 B2 | 1/2016 | Avramescu et al. | |
| 9,606,049 B1 | 3/2017 | Yang et al. | |
| 9,829,428 B2 | 11/2017 | Yang et al. | |
| 10,393,591 B2 | 8/2019 | Yang et al. | |
| 10,458,900 B2 | 10/2019 | Marta et al. | |
| 2004/0036023 A1 | 2/2004 | Hodgkinson | |
| 2006/0138327 A1 | 6/2006 | Kauppinen | |
| 2006/0175547 A1 | 8/2006 | DiFoggio et al. | |
| 2008/0035848 A1 | 2/2008 | Wong | |
| 2008/0277586 A1 | 11/2008 | Cardinale | |
| 2011/0032514 A1 | 2/2011 | Bitter et al. | |
| 2011/0249262 A1 | 10/2011 | Russell | |
| 2011/0296900 A1 | 12/2011 | Thorson | |
| 2012/0055232 A1 | 3/2012 | Thomson | |
| 2013/0008229 A1 | 1/2013 | Avramescu et al. | |
| 2013/0086977 A1 | 4/2013 | Wong | |
| 2013/0111975 A1 | 5/2013 | Gautieri | |
| 2013/0334423 A1 | 12/2013 | Henderson | |
| 2014/0091014 A1 | 4/2014 | Wagner et al. | |
| 2015/0101395 A1 | 4/2015 | Dehe et al. | |
| 2017/0102318 A1 | 4/2017 | Yang et al. | |
| 2017/0115207 A1 | 4/2017 | Yang et al. | |
| 2018/0045563 A1 | 2/2018 | Marta et al. | |
| 2018/0284012 A1 | 10/2018 | Marta et al. | |
| 2018/0299330 A1 | 10/2018 | Yang et al. | |
| 2018/0299369 A1 | 10/2018 | Marta et al. | |

FOREIGN PATENT DOCUMENTS

| | | |
|---|---|---|
| CN | 1928531 A | 3/2007 |
| CN | 101303298 A | 11/2008 |
| CN | 101949821 A | 1/2011 |
| CN | 108351293 A | 7/2018 |
| CN | 108351294 A | 7/2018 |
| CN | 108369139 A | 8/2018 |
| DE | 2926662 A1 | 1/1981 |
| DE | 3508027 A1 | 9/1986 |
| DE | 19841491 A1 | 11/2008 |
| DE | 102007020596 A1 | 11/2008 |
| DE | 102008018504 A1 | 10/2009 |
| DE | 102012217479 B3 | 10/2013 |
| EP | 1546683 | 8/2004 |
| EP | 1831671 A2 | 9/2007 |
| EP | 2060891 A1 | 5/2009 |
| EP | 2148184 A2 | 1/2010 |
| EP | 2402735 A2 | 1/2012 |
| EP | 2148184 A3 | 12/2012 |
| EP | 3265766 A1 | 1/2018 |
| EP | 3347697 A1 | 7/2018 |
| EP | 3347698 A1 | 7/2018 |
| EP | 3359933 A1 | 8/2018 |
| EP | 3359934 A1 | 8/2018 |
| GB | 710867 A | 6/1954 |
| GB | 2358245 A | 7/2001 |
| IN | 288304 | 10/2017 |
| JP | 01-172428 A | 7/1989 |
| JP | H05172627 A | 7/1993 |
| JP | H05172628 A | 7/1993 |
| JP | 05-272628 A | 10/1993 |
| JP | 408184501 | 7/1996 |
| JP | H10332579 A | 12/1998 |
| JP | H1172428 A | 3/1999 |
| JP | 2002-328116 A | 11/2002 |
| JP | 2007170841 A | 7/2007 |
| JP | 2009257808 A | 11/2009 |
| JP | 2010126465 A | 6/2010 |
| JP | 2010128781 A | 6/2010 |
| JP | 5028080 B2 | 9/2012 |
| SG | 158463 | 2/2010 |
| WO | 9624831 A1 | 8/1996 |
| WO | 9812522 A1 | 3/1998 |
| WO | 2008074442 A1 | 6/2008 |
| WO | 2016141155 A1 | 9/2016 |
| WO | 2017044435 A1 | 3/2017 |
| WO | 2017044436 A1 | 3/2017 |
| WO | 2017062617 A1 | 4/2017 |
| WO | 2017062626 A1 | 4/2017 |

OTHER PUBLICATIONS

PCT Application No. PCT/US2016/020637, International Search Report, dated Jun. 15, 2016, 3 pages.
PCT Application No. PCT/US2016/020637, Written Opinion of the International Searching Authority, dated Jun. 15, 2016, 6 pages.

(56) References Cited

OTHER PUBLICATIONS

PCT Application No. PCT/US2016/020637, International Preliminary Report on Patentability, dated Sep. 5, 2017, 7 pages.
Europe Patent Application No. 16710887.7, Communication pursuant to Rules 161(1) and 162 EPC, dated Oct. 12, 2017, 2 pages.
PCT Application No. PCT/US2016/050455, International Search Report, dated Dec. 7, 2016, 5 pages.
PCT Application No. PCT/US2016/050455, Written Opinion of the International Searching Authority, dated Dec. 7, 2016, 7 pages.
Dundas M E: "New Technologies in Infrared Hydrocarbon Detection", ISA Transactions, Instrument Society of America, Pittsburgh, U.S., vol. 31, No. 4, 1992, pp. 51-65.
Anonymous: "Flammability limit—Wikipedia, the free encyclopedia", Oct. 21, 2014 (Oct. 21, 2014), Retrieved from the Internet: URL: http://web.archive.org/web/20141021101901/http://en.wikipedia.org/wiki/Flammability_limit [retrieved on Nov. 24, 2016] substance table with LEL values; p. 4-p. 8.
PCT Application No. PCT/US2016/050456, International Search Report, dated Dec. 12, 2016, 5 pages.
PCT Application No. PCT/US2016/050456, Written Opinion of the International Searching Authority, dated Dec. 12, 2016, 7 pages.
PCT Application No. PCT/US2016/055759, International Search Report, dated Jan. 23, 2017, 4 pages.
PCT Application No. PCT/US2016/055759, Written Opinion of the International Searching Authority, dated Jan. 23, 2017, 7 pages.
David Klocke et al: "Infrared receptors in pyrophilous ("fire loving") insects as model for new un-cooled infrared sensors". Beilstein Journal of Nanotechnology, vol. 2, Mar. 30, 2011, pp. 186-197.
PCT Application No. PCT/US2016/055748, International Search Report, dated Dec. 23, 2016, 4 pages.
PCT Application No. PCT/US2016/055748, Written Opinion of the International Searching Authority, dated Dec. 23, 2016, 7 pages.
Yamashita K et al.: "Miniaturized infrared sensor using silicon diaphragm based on Golay cell", Sensors and Actuators A:L Physical, Elsevier BV, NL, vol. 66, No. 1-3, Apr. 1, 1998, pp. 29-32.
Feiertag G et al.: "Flip Chip MEMS microphone package with large acoustic volume", Procedia Engineering, Elsevier, Amsterdam, NL, vol. 5, Jan. 1, 2010, pp. reference 355-358.
Kari Schjølberg-Henriksen et al.: "Sensitive and Selective Photo Acoustic Gas Sensor Suitable for High Volume Manifacturing", IEEE Sensors 2006, EXCO, Deagu Korea, Oct. 22-25, 2006, pp. 679-682.
U.S. Appl. No. 14/879,920, Notice of Allowance, dated Oct. 7, 2016, 15 pages.
U.S. Appl. No. 14/879,920, Corrected Notice of Allowability, dated Feb. 22, 2017, 6 pages.
U.S. Appl. No. 15/400,554, Office Action, dated Mar. 3, 2017, 16 pages.
U.S. Appl. No. 15/400,554, Notice of Allowance, dated Jul. 18, 2017, 16 pages.
Kari Schjølberg-Henriksen et al., "Sensitive and Selective Photo Acoustic Gas Sensor Suitable for High Volume Manufacturing", IEEE Sensors Journal, vol. 8, No. 9, Sep. 2008, pp. 1539-1545.
PCT Application No. PCT/US2016/050455, International Preliminary Report on Patentability, dated Mar. 22, 2018, 9 pages.
Europe Patent Application No. 16766771.6, Communication Pursuant to Rules 161(1) and 162 EPC, dated Apr. 18, 2018, 3 pages.
PCT Application No. PCT/US2016/050456,International Preliminary Report on Patentability, dated Mar. 13, 2018, 8 pages.
U.S. Appl. No. 15/759,158 entitled "Gas Detector With Normalized Response and Improved Sensitivity", filed Mar. 9, 2018, 49 pages.
Christopher Grinde et al., "A Clover Shaped Silicon Piezoresistive Microphone for Miniaturized Photoacoustic Gas Sensors," Symposium on Design, Test, Integration & Packaging of MEMS/MOEMS, 2009. DTIP MEMS/MOEMS 09, pp. 256-260. Retrieved from the Internet < URL: http://www.eda-publishing.org/dtip09_proceedings.pdf#page=270>.
International Application No. PCT/US2016/055748, International Preliminary Report on Patentability, dated Apr. 10, 2018, 8 pages.
Europe Patent Application No. 16785292.0, Communication pursuant to Rules 161(1) and 162 EPC, dated May 17, 2018, 3 pages.
International Application No. PCT/US2016/055759, International Preliminary Report on Patentability dated Apr. 10, 2018, 8 pages.
Europe Patent Application No. 16784357.2, Communication pursuant to Rules 161(1) and 162 EPC, dated Jun. 7, 2018, 3 pages.
U.S. Appl. No. 15/759,165 entitled "Gas Detector With Normalized Response and Improved Sensitivity", filed Mar. 9, 2018, 51 pages.
U.S. Appl. No. 15/767,100 entitled "Electromagnetic Radiation Detector Using a Planar Golay Cell", filed Apr. 9, 2018, 21 pages.
U.S. Appl. No. 15/767,100 Office Action, dated Aug. 31, 2018, 13 pages.
Europe Patent Application No. 16766770.8, Communication pursuant to Rules 161(1) and 162 EPC, dated Apr. 18, 2017, 3 pages.
U.S. Appl. No. 15/767,100 Final Office Action, dated Dec. 18, 2018, 7 pages.
U.S. Appl. No. 15/767,100 Advisory Action, dated Mar. 1, 2019, 3 pages.
U.S. Appl. No. 15/759,165 Office Action, dated Jan. 25, 2019, 15 pages.
Annex to the communication dated Mar. 13, 2019 for EP Application No. 16785292.
CN Office Action dated Aug. 28, 2019 for CN Application No. 201680071989.
CN Office Action dated May 7, 2020 for CN Application No. 201680071989.
CN Office Action, including Search Report, dated Apr. 10, 2020 for CN Application No. 201680065487.
CN Office Action, including Search Report, dated Apr. 23, 2020 for CN Application No. 201680065395.
CN Search report with English translation dated Apr. 29, 2020 for CN Application No. 201680071989.
CN Search report with English Translation dated Aug. 19, 2019 for CN Application No. 201680071989.
Communication from the Examining Division dated Apr. 30, 2019 for EP Application No. 16766771.
Communication from the Examining Division dated Mar. 13, 2019 for EP Application No. 16785292.
English Translation of CN Office Action dated Apr. 23, 2020 for CN Application No. 201680065395.
English Translation of CN Office Action dated Aug. 28, 2019 for CN Application No. 201680071989.
English Translation of CN Office Action, including Search Report, dated Apr. 10, 2020 for CN Application No. 201680065487.
Europe Patent Application No. 16766770.8, Communication pursuant to Rules 161(1) and 162 EPC, dated Apr. 17, 2018, corrected date, 3 pages.
European Patent Application No. 16785292.0, Extended European Search Report, dated Mar. 13, 2019, 12 pages.
Huber J and Wollenstein J: "Photoacoustic CO2 sensor system: design and potential for miniaturization and integration in silicon", Proc. SPIE 9517, Smart Sensors, Actuators and MEMS VII; and Cyber Physical Systems (May 21, 2015), XP055582573, DOI: 10.1117/12.2179157.
IPEA/409—International Preliminary Report on Patentability dated Apr. 19, 2018 for WO Application No. PCT/US16/055748.
IPEA/409—International Preliminary Report on Patentability dated Apr. 19, 2018 for WO Application No. PCT/US16/055759.
IPEA/409—International Preliminary Report on Patentability dated Mar. 22, 2018 for WO Application No. PCT/US16/050456.
Non-Final Rejection dated Mar. 3, 2017 for U.S. Appl. No. 15/400,554.
Notice of Allowance and Fees Due dated Apr. 3, 2019 for U.S. Appl. No. 15/767,100.
Notice of Allowance and Fees Due dated Apr. 18, 2019 for U.S. Appl. No. 15/767,100.
Notice of Allowance and Fees Due dated Aug. 1, 2019 for U.S. Appl. No. 15/767,100.
Notice of Allowance and Fees Due dated Feb. 22, 2017 for U.S. Appl. No. 14/879,920.
Notice of Allowance and Fees Due dated Jul. 9, 2019 for U.S. Appl. No. 15/759,165.
Notice of Allowance and Fees Due dated Jul. 18, 2017 for U.S. Appl. No. 15/400,554.

(56) References Cited

OTHER PUBLICATIONS

Notice of Allowance and Fees Due dated Oct. 7, 2016 for U.S. Appl. No. 14/879,920.
Notice of Allowance and Fees Due dated Sep. 11, 2019 for U.S. Appl. No. 15/759,165.
Outgoing—ISA/210—International Search Report dated Dec. 12, 2016 for WO Application No. PCT/US16/050456.
Outgoing—ISA/210—International Search Report dated Dec. 23, 2016 for WO Application No. PCT/US16/055748.
Outgoing—ISA/210—International Search Report dated Jan. 23, 2017 for WO Application No. PCT/US16/055759.
U.S. Appl. No. 15/759,158, Office Action, dated Jan. 24, 2020, 15 pages.
Annex to the communication dated Oct. 30, 2020 for EP Application No. 16710887.
Communication from the Examining Division dated Oct. 30, 2020 for EP Application No. 16710887.
Kitamura, R., et al, "Optical Constants of Silica Glass From Extreme Ultraviolet to Far Infrared at Near Room Temperature", Applied Optics, Optical Society of America, Washington, DC, US, vol. 46, No. 33, Nov. 20, 2007, pp. 8118-8133.
Martini, Paul, et al., "Panic: A Near-infrared Camera for the Magellan Telescopes", Arxiv.Org, Cornell University Library, NY, Jun. 29, 2004, 8 pages.

\* cited by examiner

USE OF SELECTED GLASS TYPES AND GLASS THICKNESSES IN THE OPTICAL PATH TO REMOVE CROSS SENSITIVITY TO WATER ABSORPTION PEAKS

CROSS-REFERENCE TO RELATED APPLICATIONS

The resent application claims priority to and is the National Stage of International Application No. PCT/US2016/020637 filed on Mar. 3, 2016 by Marta, et al. and entitled "Use of Selected Glass Types and Glass Thicknesses in the Optical Path to Remove Cross Sensitivity to Water Absorption Peaks", which claims priority to U.S. Provisional Patent Application Ser. No. 62/128,745 filed on Mar. 5, 2015 by Marta, et al. and entitled "Use of Selected Glass Types and Glass Thicknesses in the Optical Path to Remove Cross Sensitivity to Water Absorption Peaks" both of which are incorporated herein by reference in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Infrared (IR) gas sensors may be used for analyzing a gas and determining gas density by sensing absorption of infrared light of specific wavelengths. In some cases, optical filters may be used in an IR gas sensor.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
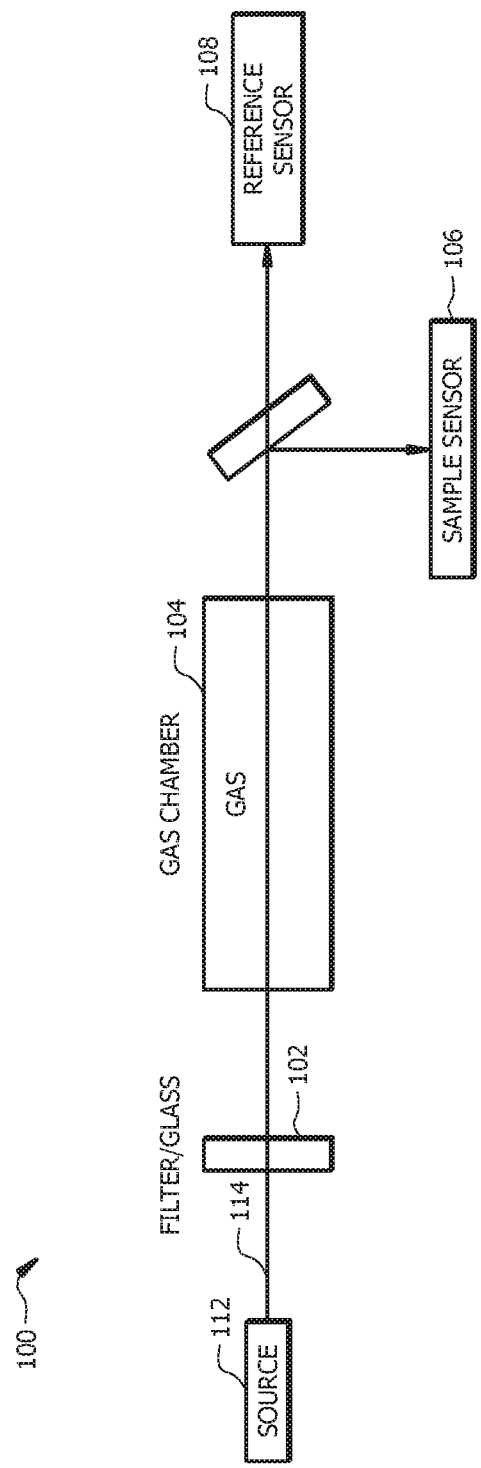
FIG. 1 illustrates an IR detector according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure relate to systems and methods for filtering unwanted wavelengths from an IR detector. In some embodiments, it may be desired to remove or reduce the wavelengths absorbed by water, to reduce the effects of water on the detection of the target gas. In some embodiments, the IR detector could also be used to remove or reduce the wavelengths absorbed by $CO_2$.

Water Free Quartz or Sapphire is typically used as a window material for flammable point infrared (IR) detectors. In combination with a typical filament or thick film (TF) broadband (BB) source, the spectrum of light propagated through the optical path includes those wavelengths absorbed by water. Interference from water is reduced by the careful selection of the interference filter passband used to determine sample and reference wavelengths. However, due to the proximity of water absorption lines to those wavelengths used for measurement, the effectiveness of this approach is limited by the achievable manufacturing tolerances and stability with temperature of interference filters.

Disclosed herein are filtering materials that can be used to remove (or reduce) the wavelength of light absorbed by water to reduce the sensitivity of a point IR detector to water. Materials that may be used include materials with hydroxyls in their molecular structure. A filter of such material(s) may be added to the optical path of a point IR detector.

Referring to FIG. 1, an exemplary flammable gas detector model 100 is shown. The gas detector 100 may comprise a filter glass 102, where a source light 112 may pass through the filter glass 102 before entering a gas chamber 104. In alternative embodiments, the filter glass 102 may be located in another position within the detector 100. The light source 112 can be positioned to provide radiation into the chamber 104 and the gas(es) within the chamber 104 may absorb a portion of the transmitted radiation. The remaining transmitted radiation may then pass to one or more sensors 106 and 108, i.e. the path 114 may continue (or pass through) to one or more sensors, such as a sample sensor 106 and a reference sensor 108. In some embodiments, the filter glass 102 may be located at any point in the path between the source 112 and the sensor(s) 106 and/or 108, even as part of the sensor window.

The radiation source 112 serves to provide radiation in the infrared spectrum to the gas chamber 104. Any suitable source of IR radiation can be used for the radiation source 112, and the radiation source 112 may comprise focusing elements (e.g., lenses, etc.) in addition to radiation emitting elements. In an embodiment, the radiation source can comprise one or more IR lamps, light emitting diodes (LEDs), and the like. An integrated power supply can be coupled to the radiation source 112. For example, a 50 to 500 kHz power supply can be used to power the radiation source 112 to initiate and maintain the discharge of the IR radiation.

The radiation provided by the radiation source 112 can be provided within the chamber 104 or one or more windows can be used to allow the radiation to pass into the chamber and either transmit through the chamber 104 or be absorbed by the gas within the chamber 104. The filter glass 102 or other kind of spectral filter can be used to filter the IR light and allow a desired portion of the IR spectrum to pass through to the sensor(s) 106 and 108. The sensor(s) 106 and 108 can comprise any sensor sensitive to IR radiation in the absorption band of the target gas. The sensors 106 and 108 can comprise thermal detectors (Thermocouples, Thermopiles, Bolometer, Pneumatic cell, Pyroelectric detector or the like) or Quantum detectors (PbS, PbSe, InAs, HgCdTe or the like). The detector 100 may function in a similar fashion to a typical IR detector, as would be understood by those skilled in the art.

In the present embodiment, the material of the filter glass 102 may be chosen to filter specific wavelengths of light, such as those absorbed by water. This may reduce the sensitivity of the detector 100 to water, thereby minimizing the issues of manufacturing tolerance and temperature sensitivity of interference filters. The detector may utilize the spectral absorption properties of certain materials to remove (or reduce) the wavelengths of light absorbed by water from the optical spectrum used for the measurement of gas. The materials that may be used in the filter glass 102 may contain hydroxyls in their molecular structure, for example, Fused Silica. In some embodiments, the filter glass 102 may comprise crown glass (such as BK7).

Crown glass is a type of optical glass used in lenses and other optical components. It has relatively low refractive index (about 1.52) and low dispersion (with Abbe numbers around 60). Crown glass is produced from alkali-lime (RCH) silicates containing approximately 10% potassium oxide and is one of the earliest low dispersion glasses. As well as the specific material named crown glass, there are other optical glasses with similar properties that are also called crown glasses. Generally, this is any glass with Abbe numbers in the range 50 to 85. For example, the borosilicate glass Schott BK7 is an extremely common crown glass, used in precision lenses. Borosilicates contain about 10% boric oxide, have good optical and mechanical characteristics, and are resistant to chemical and environmental damage. Other additives used in crown glasses include zinc oxide, phosphorus pentoxide, barium oxide, fluorite and lanthanum oxide. A concave lens of flint glass is commonly combined with a convex lens of crown glass to produce an achromatic doublet. The dispersions of the glasses partially compensate for each other, producing reduced chromatic aberration compared to a singlet lens with the same focal length.

Figure 2A:
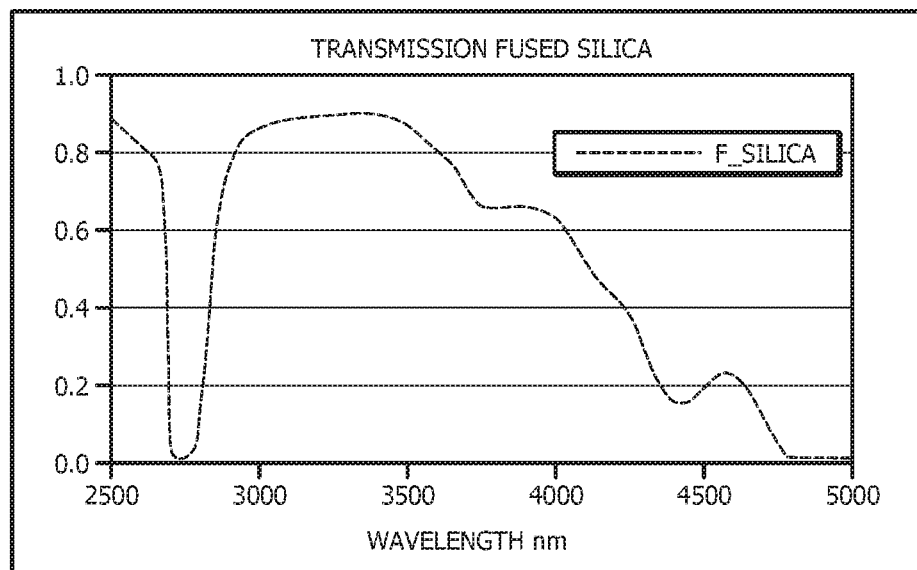
FIGS. 2A-2B illustrates the absorbed wavelengths of fused silica and water.
Figure 2B:
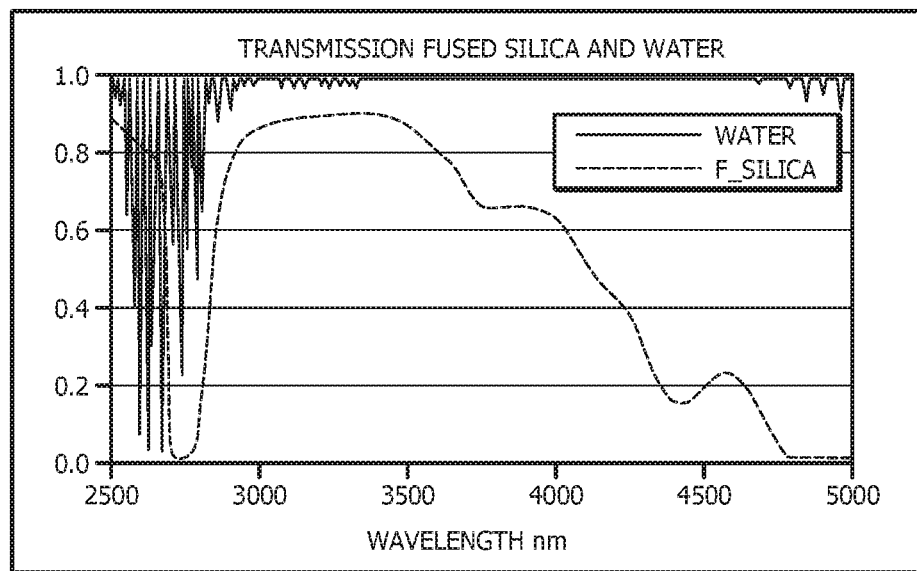

Referring now to FIGS. 2A-2B, the transmission spectra of Fused Silica is illustrated in Graph 1. The transmission spectra of Fused Silica may result in a reduction in transmission. The reduction in transmission between 2600 nanometers (nm) and 2900 nm is due to the hydroxyl within the material. Also, this reduction in transmission overlaps the absorption spectra of water, as shown in Graph 2. Therefore the utilization of Fused Silica windows would fulfill the requirement of removing (or reducing) those wavelengths of light that are absorbed by water and reducing a Point IR detector's cross sensitivity to water.

Further, the transmission characteristics of a material of a given thickness are described by the Beer-Lambert Law which describes the absorbance of a material as a function of its molar absorptivity and the optical path length through the material. Where the molar absorptivity is high, transmission of light through the material is low for all practical values of path length. However, at lower values of molar absorptivity, transmission can be controlled over a wide range of values by adjusting the thickness of the material. Additionally, in some materials the molar absorptivity is seen to be a relatively low function of wavelength over particular ranges of wavelengths. For these materials it is possible to control the effective transmission bandwidth of the material by adjusting its thickness.

Figure 3:
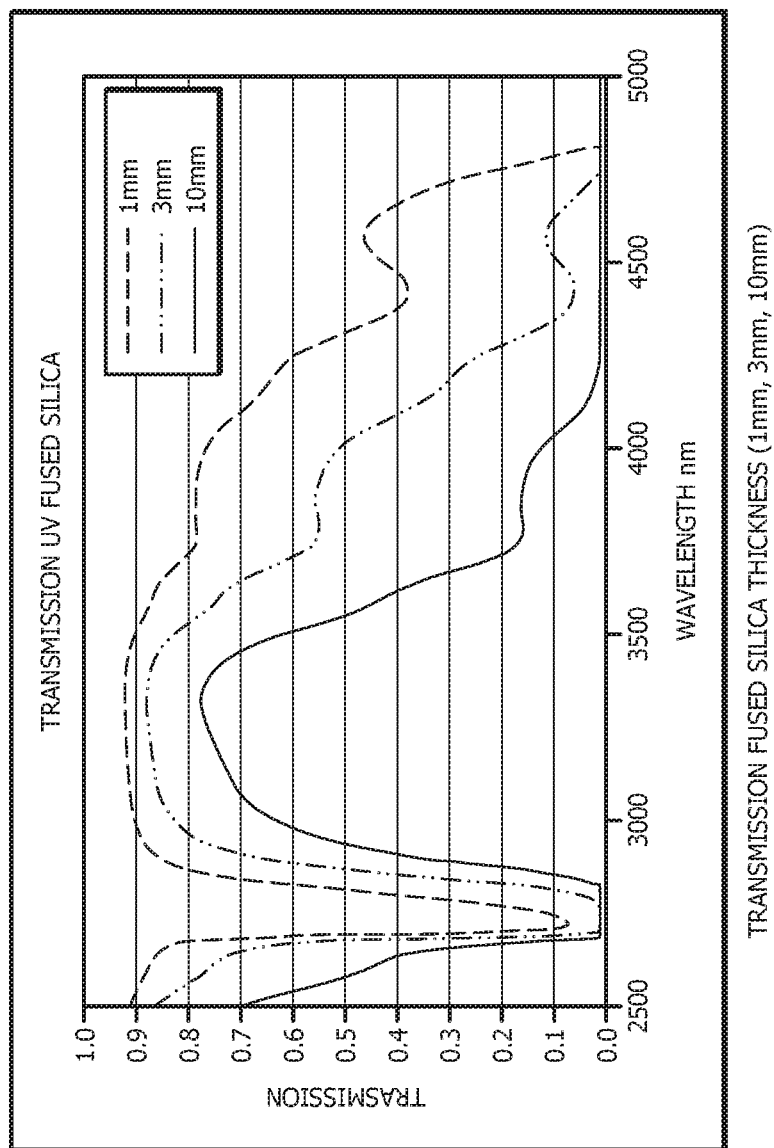
FIG. 3 illustrates the absorbed wavelengths of fused silica comparing different thicknesses of the fused silica.

In FIG. 3 it can be seen that Fused Silica is again an example of a material that exhibits this behavior. The upper cut-off wavelength of the transmission band (about 2900 nm to about 4000 nm) is strongly dependent upon the thickness of the material, changing from 3500 nm to 4300 nm as the thickness is reduced from 10 millimeters (mm) to 1 mm, with the thinner glass allowing transmission beyond 4500 nm.

Therefore, it can be seen that the operating wavelength spectrum of an IR point gas detector can be controlled by the correct selection and dimensioning of the optical windows utilized in its design. For example, a window manufactured from Fused Silica at a thickness of about 3 mm would give a transmission band of about 2900 nm to 4100 nm, or in some cases 2900 nm to 4300 nm.

Figure 4:
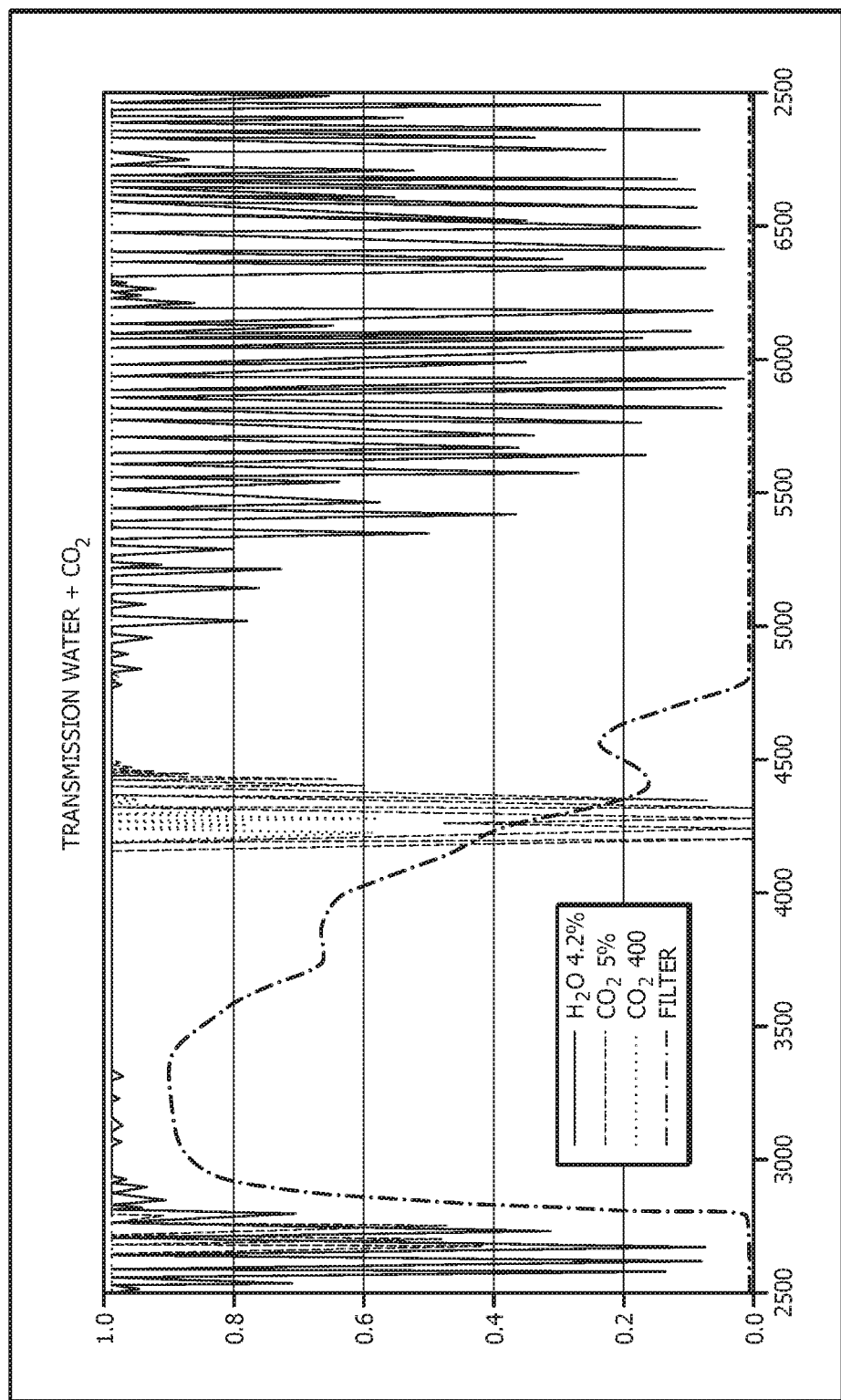
FIG. 4 illustrates the absorbed wavelengths of fused silica, $CO_2$, and water.

FIG. 4 illustrates another example, combining the transmission of water and carbon dioxide ($CO_2$), where $CO_2$ is the target gas for measurement by the point IR detector. As shown in the graph, the filter would only allow transmission between about 2800 nm and 4800 nm. The transmission of water falls outside that range, while the transmission of $CO_2$ is between about 4000 and 4500 nm. Therefore, the filter would successfully remove the interference of water. The measurements shown in FIG. 4 may be taken from a mixture that comprises the following: water 4.2% (v/v) (100% relative humidity at 30° C.), $CO_2$ 5% (v/v) (50,000 ppm—human exhaled breath), and $CO_2$ 400 ppm (atmospheric concentration). In some embodiments, the filter may be designed to block interference from water and $CO_2$, allowing for the detection of one or more target hydrocarbon flammable gases.

Some embodiments of the disclosure may comprise a method for filtering specific wavelengths in an IR detector. In some embodiments, the filtering method may specifically target wavelengths of water absorption. The method may comprise adding a filtering material to the IR detector path, where the filtering material comprises hydroxyls in its molecular structure.

Some embodiments of the disclosure may comprise an IR detector comprising a filter glass operable to filter one or more wavelengths from the source light, where the filter glass comprises one or more materials that contain hydroxyls in their molecular structure, and where the spectral absorption properties of the filter glass are operable to at least reduce wavelengths of light absorbed by water from the optical path, thereby reducing the IR detector's cross sensitivity to water.

In some embodiments, the spectral absorption properties of the filter glass are also operable to at least reduce the wavelengths of light absorbed by carbon dioxide ($CO_2$), thereby reducing the IR detector's cross sensitivity to $CO_2$. In some embodiments, the one or more materials comprise Fused Silica. In some embodiments, the one or more materials comprise a crown glass. In some embodiments, the thickness of the filter glass is between about 0.5 mm to 16 mm, 0.7 mm to 10 mm, or 1 mm and 3 mm. In some embodiments, the thickness of the filter glass is about 3 mm. In some embodiments, the thickness of the filter glass is about 2 mm. In some embodiments, the wavelengths that are not filtered by the filter glass are between about 2900 nanometers (nm) to about 4100 nm. In some embodiments, the wavelengths filtered by the filter glass are less about 3000 nm. In some embodiments, the wavelengths filtered by the filter glass are greater than about 4000 nm. In some embodiments, the IR detector may further comprise a source light, a gas chamber, and one or more detectors. In some embodiments, the filter glass is located between the source and the one or more sensors within the IR detector. In some embodiments, the filter glass is located between the source and the gas chamber within IR detector. In some embodiments, the filter glass is attached to one of the sensors.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An infrared detector comprising:
   a light source configured to emit light;
   one or more sensors configured to receive at least a portion of the light emitted by the light source; and
   a filter glass located in an optical path between the light source and the one or more sensors, the filter glass having spectral absorption properties with regard to the light emitted, the spectral absorption properties being dependent upon at least a thickness of the filter glass and a composition of the filter glass,
   wherein the thickness of the filter glass is between 1 millimeter and 3 millimeters;
   wherein the filter glass comprises one or more materials that contain hydroxyls in their molecular structure, the one or more materials comprising Fused Silica, the thickness and composition of the filter glass being operable to filter out wavelengths less than 2900 nm and greater than 4100 nm from the light emitted by the light source, and
   wherein filtering out the wavelengths less than 2900 nm and greater than 4100 nm from the light filters out wavelengths that would be absorbed by water and carbon dioxide along the optical path and reduces the infrared detector's cross sensitivity to water and carbon dioxide.

2. The infrared detector of claim 1, wherein the one or more materials further comprise a crown glass.

3. The infrared detector of claim 1, wherein the thickness of the filter glass is 3 millimeters.

4. The infrared detector of claim 1, wherein the thickness of the filter glass is 2 millimeters.

5. The infrared detector of claim 1, wherein the wavelengths that are not filtered by the filter glass are between 2900 nanometers (nm) to 4100 nm.

6. The infrared detector of claim 1, further comprising a gas chamber, wherein the optical path is formed from the light source, through the gas chamber, through at least a portion of the filter glass, and to the one or more sensors.

7. The infrared detector of claim 6, wherein the filter glass is located between the light source and the gas chamber.

8. The infrared detector of claim 6, further comprising a first sensor that is a sample sensor and a second sensor that is a reference sensor.

9. The infrared detector of claim 1, wherein at least a portion of the filter glass has one of a concave form factor or a convex form factor, and wherein the spectral absorption properties of the filter glass are due at least in part to the concave or convex form factor of at least the portion of the filter glass.

10. The infrared detector of claim 9, wherein the filter glass comprises a concave lens of flint glass and a convex lens of crown glass, the flint glass and the crown glass configured together to produce an achromatic doublet.

11. The infrared detector of claim 10, wherein the achromatic doublet produced by the combination of the flint glass and the crown glass results in reduced chromatic aberration compared to a singlet lens having a same focal length.

12. The infrared detector of claim 1, wherein the filter glass is water free.

13. The infrared detector of claim 1, wherein the filter glass is free of liquids.

14. The infrared detector of claim 1, wherein the one or more sensors configured to receive at least a portion of the light source can comprise thermal detectors, thermocouples, thermopiles, bolometers, pneumatic cells, pyroelectric detectors, quantum detectors, PbS, PbSe, InAs, and HgCdTe.

15. A method for filtering specific wavelengths in an infrared detector, wherein the method specifically targets wavelengths of water absorption, the method comprising:
   disposing a filtering material in an optical path between a light source and one or more sensors, wherein the filtering material comprises hydroxyls in its molecular structure, wherein the filtering material has a thickness between 1 millimeter and 3 millimeters, and wherein the filtering material comprises Fused Silica;
   emitting, from the light source, a light towards the one or more sensors along an optical path that passes through at least a portion of the filtering material;
   filtering the light with the filtering material to remove wavelengths of light absorbed by water and by carbon dioxide from the optical path, wherein the thickness and composition of the filtering material are operable to filter out wavelengths less than 2900 nm and greater than 4100 nm, that would be absorbed by water or carbon dioxide along the optical path, from the light emitted by the light source; and
   sensing, using the one or more sensors, the filtered light with a reduced sensitivity to water and carbon dioxide along the optical path.

16. The method of claim 15, wherein the filtering material further comprises a crown glass.

17. A filter material for use with an infrared detector, the filter material comprising:
   one or more materials that contain hydroxyls in their molecular structure, wherein the one or more materials comprise fused silica,
   wherein a thickness of the filter material is between 1 millimeter and 3 millimeters,
   wherein spectral absorption properties of the filter material are operable to filter out wavelengths of light less than 2900 nm and greater than 4100 nm, the light being transmitted through the filter material from a light source, wherein the wavelengths filtered out would otherwise be absorbed by water or carbon dioxide along an optical path that passes through at least a portion of the filter material, and wherein the filtering out of the wavelengths reduces the infrared detector's cross sensitivity to water and carbon dioxide.

18. The filter material of claim 17, wherein the filter material further comprises a crown glass.

19. The filter material of claim 17, wherein the filter material is configured to be located between the light source and a gas chamber of the infrared detector.

20. The filter material of claim 17, wherein the filter material comprises a thickness of 2 millimeters.

* * * * *